United States Patent [19]

Dymond

[11] Patent Number: 4,669,920

[45] Date of Patent: Jun. 2, 1987

[54] SOIL SEALING COMPOSITIONS AND METHODS

[75] Inventor: Brian Dymond, West Yorkshire, England

[73] Assignee: Allied Colloids Ltd., England

[21] Appl. No.: 890,751

[22] Filed: Jul. 25, 1986

[30] Foreign Application Priority Data

May 2, 1986 [GB] United Kingdom ............... 8610762

[51] Int. Cl.⁴ .................. C09K 17/00; E02D 3/12
[52] U.S. Cl. .................... 405/264; 405/263; 166/294; 252/8.551; 106/74
[58] Field of Search ............ 405/263, 264, 267, 266; 106/74, 900, 84; 166/295, 294, 288; 427/136; 252/8.55 R; 524/65, 166

[56] References Cited

U.S. PATENT DOCUMENTS

| | | | |
|---|---|---|---|
| 3,772,893 | 11/1973 | Eilers | 405/264 |
| 3,832,229 | 8/1974 | Du Brow et al. | 427/136 |
| 4,072,020 | 2/1978 | Bishop | 405/264 |
| 4,354,875 | 10/1982 | Powers et al. | 106/74 |
| 4,366,071 | 12/1982 | McLaughlin et al. | 252/8.55 R |
| 4,536,305 | 8/1985 | Borchardt et al. | 252/8.55 R |
| 4,558,741 | 12/1985 | Borchardt et al. | 166/294 X |
| 4,592,931 | 6/1986 | Cargle | 405/264 X |

Primary Examiner—Dennis L. Taylor
Attorney, Agent, or Firm—Ostrolenk, Faber, Gerb & Soffen

[57] ABSTRACT

A soil sealing composition suitable for reducing the permeability of soil to water contaminated with electrolyte comprises an expanding lattice clay and a water soluble or water swellable polymer having a molecular weight of at least 500,000 and that is a copolymer of 2-acrylamido-2-methyl propane sulphonic acid, or certain other ethylenically unsaturated sulphonic acids, together with other ethylenically unsaturated monomer, preferably a blend of acrylamide and acrylic acid.

18 Claims, No Drawings

SOIL SEALING COMPOSITIONS AND METHODS

It is well known to seal the soil around, for instance, ponds, lagoons or ditches so as to reduce water seepage through it. One way of doing this is by applying to the soil a mixture of an expanding lattice clay and a synthetic polymer. In U.S. Pat. No. 3,520,140 a cross linked, powdered polymer is used. In U.S. Pat. No. 3,772,893 a linear high molecular weight polymer is used. A wide variety of polymers are named including, for instance, polymers made using vinyl sulphonic acid but these are not exemplified. Certain acrylate polymers are proposed in U.S. Pat. No. 3,986,365.

Unfortunately the seepage resistance properties are usually detrimentally affected by the presence of water soluble contaminants, particularly inorganic salts and especially polyvalent metal ions such as calcium and magnesium, in the water contained by the soil or in the water that is initially added to the polymer in the soil. It is often recommended therefore to hydrate the polymer and clay in the soil mixture (or applied as a suspension) using good quality water prior to introduction of any contaminants. Even then the contaminants will eventually damage the clay barrier and allow a higher level of seepage. In U.S. Pat. Nos. 3,949,560 and 4,021,402 dispersants are included with the high molecular weight polymer and these may achieve some improvement in properties.

It has been our object to devise soil sealing compositions and methods that are not so sensitive to contamination by, especially, polyvalent metal salts in the water that is to be retained.

A soil sealing composition according to the invention comprises an expanding lattice clay and a water soluble or water swellable polymer that has a molecular weight of at least 500,000 and that is a copolymer of (A) 15 to 90% by weight of at least one monomer selected from allyl sulphonic acid and monomers of the formula

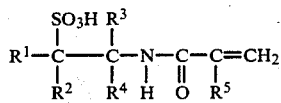

where $R^3$ and $R^4$ are each $C_{1-6}$ alkyl, substituted aryl, unsubstituted aryl, and $C_{6-12}$ aralkyl, $R^1$ and $R^2$ are selected from the same groups as $R^3$ and $R^4$ and hydrogen, and $R^5$ is hydrogen or $C_{1-6}$ alkyl and (B) 85 to 10% by weight of least one other ethylenically unsaturated monomer.

$R^1$ and $R^2$ are preferably hydrogen or $C_{1-4}$ alkyl, e.g. they may both be hydrogen or one may be hydrogen and the other methyl. $R^5$ is preferably methyl or, most preferably, hydrogen. $R^3$ and $R^4$ are preferably both $C_{1-14}$ alkyl, especially methyl, or one may be methyl and the other phenyl.

The preferred monomer A is 2-acrylamido-2-methyl propane sulphonic acid (AMPS, trade mark). All monomers A are usually present as water soluble salts, usually the sodium salt.

The monomers B should be water soluble or a water soluble blend and are usually carboxylic acid or nonionic acrylic monomers. Suitable carboxylic acid monomers include methacrylic, itaconic, maleic and, preferably, acrylic acid usually present as a water soluble salt, usually the sodium salt. Suitable nonionic monomers include (meth) acrylamide and N alkyl (meth) acrylamide, preferably acrylamide.

It is particularly preferred to use a blend of nonionic and carboxylic acid monomers, most preferably acrylamide and acrylic acid (usually as sodium salt).

The amount of monomer A must be not more than 90% by weight but must be at least 15% since lower or higher amounts give inferior results. Preferably the amount is at least 20 or, preferably at least 25% and most preferably it is at least 35%. This is very surprising as it might be expected that the homopolymer would give best results and that quite low amounts of monomer A would be as good as medium amounts of the monomer. The amount of monomer A is preferably below 80% and best results are obtained with below 70%. The amount is preferably at least 40%, most preferably 40 to 65% by weight.

When monomer B is a blend of sodium acrylate and acrylamide the amount of each is generally in the range 2.5 to 70%. The amount of acrylamide is preferably 10 to 70% most preferably 30 to 60%, and the amount of sodium acrylate (or other salt of acrylic acid) is preferably 2.5 to 30%, most preferably 5 to 15% by weight. The molecular weight of the polymer is preferably at least 1 million, e.g. 2 to 10 million, and may be higher, e.g. up to 20 million or more. The intrinsic viscosity is generally at least 2 or 3, and often is in the range 5 to 7.

The polymer is preferably water soluble and linear, but cross linked polymers can be used, especially if the amount of cross linking is low so that the polymers are highly swellable or partially soluble.

The polymer may have been made by polymerisation in conventional manner, e.g. gel polymerisation followed by drying and comminution, or reverse phase bead polymerisation followed by drying and separation of the beads. The resultant powder may have any desired particle size, e.g. in the range 50 μm to 2 mm, but small particles (e.g. below 100 μm) are preferred if the polymer is not wholly soluble. Alternatively the polymer may have been made by reverse phase polymerisation to a particle size of, e.g. below 10 μm and may be supplied as a dispersion (usually a dry dispersion) of polymer in oil.

The lattice clay may be any expanding lattice clay suitable for soil sealants, and generally is a bentonite. Examples are montmorillonite, hectonite, saponite and nontronite.

The amount of polymer (dry weight) is usually 0.05 to 10%, preferably 0.1 to 5%, most preferably 0.2 to 2%, based on the blend of clay and polymer.

The composition is preferably a dry blend of the polymer and the clay.

The invention includes a method of soil sealing in which a clay and a polymer as defined above (preferably as a preformed composition) are mixed with the soil that is to be sealed and water is incorporated in the mixture.

The method may be performed by applying a slurry of polymer, clay and water to the soil, e.g. over the soil, but preferably the soil, clay and polymer are mixed without deliberate addition of water (e.g. by digging a powder composition or a blend of clay and latex polymer, into the soil) and the mixture is then wetted. Usually the mixture is compacted in known manner, generally before wetting.

The water used for the wetting can be contaminated water (e.g. the water that is to be retained by the soil)

but it is often preferred to use water that is substantially free of impurities (e.g. ordinary tap water). The amount of water should be sufficient to swell the clay and swell or dissolve the polymer and is generally in excess.

The following are examples. Every polymer that was tested had a molecular weight above 1 million.

For simplicity all evaluations to define the impermeability of the clay/polymer barrier have been by pressure filtration tests at 100 psi measuring the rate of filtrate loss from a 5% suspension. Ideally, tests should be carried out laying down a layer of soil incorporating the clay additive, applying water to build up a hydrostatic head above the soil barrier and measuring the equilibrium rate of percolation through the barrier.

The following polymers were tested. ACM is acrylamide; MaAc is sodium acrylate and Na AMPS is the sodium salt of amps.

A   Acrylamide homopolymer
B   30:70 Na acrylate/ACM copolymer
C   50:50 Na acrylate/ACM copolymer
D   Na AMPS homopolymer
E*   60:7.5:32.4 Na AMPS/Na Ac/ACM copolymer
F*   50:7.5:42.5 Na AMPS/Na Ac/ACM copolymer
G*   40:7.5:52.5 Na AMPS/Na Ac/ACM copolymer
H   30:7.5:62.5 Na AMPS/Na Ac/ACM copolymer
I*   50:10:40 Na AMPS/Na Ac/ACM copolymer
J   25:10:65 Na AMPS/Na Ac/ACM copolymer
K   25:5:70 Na AMPS/Na Ac/ACM copolymer
L*   60:7:33 Na AMPS/Na Ac/ACM copolymer
M*   50:50 Na AMPS/ACM copolymer
N*   50:50 Na AMPS/NaAc
O   40:60 NaAc/ACM copolymer cross linked to be highly water swelling but not soluble
P   N—Vinyl N—methyl acetamide homopolymer (known to be very resistant to calcium impurities)

Those marked * are the preferred products of the invention.

EXAMPLE 1

A 5% suspension in water of Clay A including 1% polymer addition on clay was prepared and allowed to hydrate for 24 hours. Contaminants were applied at 0.5% on total volume, thoroughly mixed and left to stand for at least 24 hours. After remixing, the slurry was placed in a pressure filtration cell and the quantity of filtrate given at a differential pressure of 100 psi through a Whatman No 50 filter paper was measured after a 30 minute period.

TABLE 1a

| | Fluid loss (cc) with Various Contaminants | | |
|---|---|---|---|
| | | Polymer | |
| Contaminant | NONE | Sample B | Sample D |
| CaCl$_2$ | 73 | 71 | 63 |
| MgCl$_2$ | 72 | 61 | 57 |

TABLE 1a-continued

| | Fluid loss (cc) with Various Contaminants | | |
|---|---|---|---|
| | | Polymer | |
| Contaminant | NONE | Sample B | Sample D |
| Diesel oil | 16.5 | 10.5 | 13.5 |
| NONE | 16.5 | 12.5 | 13 |

TABLE 1b

| | Fluid loss with 0.5 CaCl$_2$ | | | | | | | | | | | | | | | |
|---|---|---|---|---|---|---|---|---|---|---|---|---|---|---|---|---|
| Polymer | None | A | B | C | D | E* | F* | G* | H | I* | J | K | L* | M* | N* | O | P |
| Fluid loss (cc) | 73 | 64 | 71 | 53.5 | 63 | 35 | 38 | 39 | 66 | 38 | 60 | 64 | 39 | 41 | 47 | 70 | 57 |

EXAMPLE 2

This series is the same as in Example 1 but using an alternative bentonitic clay, Clay B.

TABLE 2a

| | Fluid loss (cc) with Various Contaminants | | |
|---|---|---|---|
| | | Polymer | |
| Contaminant | NONE | Sample B | Sample D |
| CaCl$_2$ | 78 | 112 | 76 |
| McCl$_2$ | 76.5 | 76.5 | 76.8 |
| Diesel oil | 22 | 13 | 15.5 |
| NONE | 20.5 | 13.5 | 16.5 |

TABLE 2b

| | Fluid Loss with 0.5% CaCl$_2$ | | | | | | | | | | | | |
|---|---|---|---|---|---|---|---|---|---|---|---|---|---|
| Polymer | None | B | D | E* | F* | G* | H | I* | J | K | L* | M* | N* |
| Fluid loss (cc) | 78 | 112 | 76 | 45 | 46 | 46 | 96 | 50 | 70 | 90 | 41 | 51 | 56 |

I claim:

1. A method of reducing the permeability of soil to water, the method comprising forming a mixture of the soil, water, an expanding lattice clay, and a water soluble or water swellable polymer in an amount of 0.05 to 10% by weight of the clay and polymer, and in which the polymer has a molecular weight of at least 500,000 and is a copolymer of (A)

15 to 90% by weight of at least one monomer selected from allyl sulphonic acid and monomers of the formula

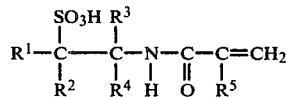

where $R^3$ and $R^4$ are each $C_{1-6}$ alkyl, substituted aryl, unsubstituted aryl, and $C_{6-12}$ aralkyl, $R^1$ and $R^2$ are selected from the same groups as $R^3$ and $R^4$ and hydrogen, and $R^5$ is hydrogen or $C_{1-6}$ alkyl and (B) 85 to 10% by weight of least one other ethylenically unsaturated monomer.

2. A method according to claim 1 in which monomer A is 2-acrylamido-2-methyl propane sulphonic acid.

3. A method according to claim 1 in which the amount of monomer A is 25 to 70% by weight of the monomers.

4. A method according to claim 1 in which the amount of monomer A is 35 to 70% by weight of the monomers.

5. A method according to claim 1 in which monomer B is selected from ethylenically unsaturated carboxylic acid monomers and acrylamide.

6. A method according to claim 1 in which monomer B is a blend of 2.5 to 70% acrylic acid or a salt thereof and 10 to 70% acrylamide, the amounts being by weight based on the total weight of monomers.

7. A method according to claim 1 in which monomer B is a blend of 2.5 to 30% sodium acrylate and 10 to 60% acrylamide, the amounts being by weight based on the total weight of monomers.

8. A method according to claim 1 in which the polymer is a linear water soluble polymer.

9. A method according to claim 1 in which the polymer has a molecular weight of 2 to 10 million.

10. A soil sealing composition comprising an expanding lattice clay and a water soluble or water swellable polymer that has a molecular weight of at least 500,000 and that is present in an amount of 0.05 to 10% by weight of the clay and polymer, and in which the polymer is a copolymer of (A) 15 to 90% by weight of at least one monomer selected from allyl sulphonic acid and monomers of the formula

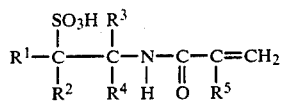

where $R^3$ and $R^4$ are each $C_{1-6}$ alkyl, substituted aryl, unsubstituted aryl, and $C_{6-12}$ aralkyl, $R^1$ and $R^2$ are selected from the same groups as $R^3$ and $R^4$ and hydrogen, and $R^5$ is hydrogen or $C_{1-6}$ alkyl and (B) 85 to 10% by weight of least one other ethylenically unsaturated monomer.

11. A composition according to claim 10 in which monomer A is 2-acrylamido-2-methyl propane sulphonic acid.

12. A composition according to claim 10 in which the amount of monomer A is 25 to 70% by weight of the monomers.

13. A composition according to claim 10 in which the amount of monomer A is 35 to 70% by weight of the monomers.

14. A composition according to claim 10 in which monomer B is selected from ethylenically unsaturated carboxylic acid monomers and acrylamide.

15. A composition according to claim 10 in which monomer B is a blend of 2.5 to 70% acrylic acid or a salt thereof and 10 to 70% acrylamide, the amounts being by weight based on the total weight of monomers.

16. A composition according to claim 10 in which monomer B is a blend of 2.5 to 30% sodium acrylate and 10 to 60% acrylamide, the amounts being by weight based on the total weight of monomers.

17. A composition according to claim 10 in which the polymer is a linear water soluble polymer.

18. A composition according to claim 10 in which the polymer has a molecular weight of 2 to 10 million.

* * * * *